United States Patent [19]

Hauss et al.

[11] 3,717,621

[45] Feb. 20, 1973

[54] MANUFACTURE OF VINYL CHLORIDE POLYMERS

[75] Inventors: Alfred Hauss, Ludwigshafen; Fritz Kieferle, Limburgerhof; Jenoe Kovacs, Bobenheim-Roxheim; Erich Gulbins, Heidelberg, all of Germany

[73] Assignee: Badische Anilin- & Soda-Fabrik Aktiengesellschaft, Ludwigshafen/Rhine, Germany

[22] Filed: March 16, 1970

[21] Appl. No.: 20,128

[30] Foreign Application Priority Data

Mar. 26, 1969 Germany............... P 19 15 386.7

[52] U.S. Cl. .............260/85.5, 260/86.3, 260/87.1, 260/87.5 C, 260/92.8 W, 260/87.5 R
[51] Int. Cl. ............................C08f 1/11, C08f 3/20
[58] Field of Search ...................260/92.8 W, 87.5 R

[56] References Cited

UNITED STATES PATENTS

| 2,975,162 | 3/1961 | Iloff | 260/92.8 W |
| 3,022,282 | 4/1965 | Marous et al. | 260/92.8 W |
| 3,205,204 | 9/1965 | Heckmaier et al. | 260/92.8 W |
| 3,375,238 | 3/1968 | Bauer et al. | 260/92.8 W |

FOREIGN PATENTS OR APPLICATIONS

| 1,249,525 | 9/1967 | Germany | 260/92.8 W |
| 1,102,980 | 2/1968 | Great Britain | 260/92.8 W |
| 1,277,888 | 10/1961 | France | 260/92.8 W |

*Primary Examiner*—James A. Seidleck
*Assistant Examiner*—J. A. Donahue, Jr.
*Attorney*—Johnston, Root, O'Keeffe, Keil, Thompson & Shurtleff

[57] ABSTRACT

Vinyl chloride is polymerized in aqueous suspension at temperatures between 35° and 75 °C at a pH of less than 8.0 and in the presence of an initiator system in which acetyl cyclohexane sulfonyl peroxide is mixed either with t-butyl perpivalate or with di-isopropyl percarbonate. The product may be used like conventional polyvinyl chloride as a plastics material.

7 Claims, No Drawings

MANUFACTURE OF VINYL CHLORIDE POLYMERS

It is well known that vinyl chloride may be polymerized in aqueous suspensions containing free-radical-generating initiators. Suitable free-radical-generating compounds are, for example, organic peroxy or azo compounds. A list of known initiators is given in "Polymer Handbook" (Interscience Publishers), 1966 II, pages 1 to 55.

Lauroyl peroxide (LPO) and azoisobutyronitrile (AIBN) are the best known initiators for the suspension polymerization of vinyl chloride. However, they cause slow initial polymerization at the usual polymerization temperatures of 35 to 72 °C. Toward the end of the reaction the heat of polymerization given off reaches such a level (due to the galling effect of the polymer) that the cooling capacity of the reactor is insufficient to maintain the desired reaction temperature. The amount of initiator used must therefore be limited to such an extent that the final reaction can still be kept under control. This in turn further reduces the initial conversion rate, with the result that the total polymerization time is unduly long.

Proposals have therefore been made to add a more active initiator to the said relatively slowly decomposing initiators. Combinations comprising acetyl cyclohexane sulfonyl peroxide (ASP) and LPO (German Printed application DAS No. 1,217,624) or ASP and AIBN (German Printed application DAS No. 1,032,542) do indeed produce sufficiently high initial polymerization rates. Although such combinations shorten the total time of the reaction, they do not provide constantly high utilization of the cooling capacity of the reactors and the polymerization times are still too long.

Further progress was achieved by using percarbonates, for example di-isopropyl percarbonate (IPP), as polymerization initiators in the suspension polymerization of vinyl chloride (German Printed applications DAS Nos. 1,099,738 and 1,191,104). At relatively high temperatures they do produce a higher initial rate, which remains constant up to a conversion of approximately 75 percent, but the conversion rate drops very quickly beyond that, with the result that there is no substantial reduction in the running time at the desired conversion levels of about 90 percent. If, on the other hand, IPP is used at relatively low temperatures there occurs, similar to when LPO is used, a marked gelling effect giving rise to a strong final reaction which is hardly controllable.

A further improvement was obtained by adding LPO, which decomposes slowly, to IPP. In this case, however, the polymerization becomes so violent toward the end that it is only possible to control heat removal by using relatively small amounts of initiators, which again sets a limit to the reduction of the running time.

It is an object of the invention to provide a process for the polymerization of vinyl chloride which has a particularly short running time and in which polymerization occurs as steadily as possible such that the heat may be efficiently removed even at relatively high initiator concentrations.

Thus the invention provides a process for the manufacture of polymers and copolymers of vinyl chloride by the polymerization of vinyl chloride, optinally together with up to 30 percent by weight of comonomers, in aqueous suspension in the presence of peroxidic initiators and conventional water-soluble protective colloids, wherein the initiators comprise mixtures of 0.001 to 0.06 parts by weight of acetyl cyclohexane sulfonyl peroxide with 0.002 to 0.1 part by weight of t-butyl perpivalate or di-isopropyl percarbonate, per 100 parts of monomer, polymerization being carried out substantially at a pH of less than 8.0 and at temperatures between 35 °C and 75 °C.

According to a special embodiment of the invention the initiator comprises a mixture of 0.001 to 0.06 part by weight of ASP with 0.005 to 0.1 part by weight of TBP, per 100 parts of monomer, polymerization being carried out at a pH between 4.0 and 7.0 and at temperatures between 50 ° and 72 °C.

Another embodiment of the invention is characterized in that the initiator comprises a mixture, by weight, of 0.001 to 0.06 part of ASP with 0.002 to 0.1 part of IPP, per 100 parts of monomer, polymerization being carried out at a pH of 4.0 to 7.0 and at temperatures between 50 ° and 66 °C.

The process is suitable for producing both homopolymers and copolymers of vinyl chloride. Suitable comonomers are, for example, propylene, vinyl acetate, vinylidene chloride, acrylonitrile and acrylic esters and they may be added to the vinyl chloride in quantities of up to about 30 percent by weight.

The polymerization is carried out in the presence of commonly used water-soluble suspension stabilizers. The protective colloids may be, for example, polyvinyl alcohols, cellulose ethers, gelatin or polyvinyl pyrrolidone in a total concentration of approximately 0.01 to 1.0 percent by weight of the monomers used, with the optional addition of the usual surfactants. Polymerization is carried out in the absence of atmospheric oxygen in aqueous suspension. The ratio of water to monomers can vary between 1:1 and 4:1.

The polymerization temperature depends on the desired molecular weight of the product. It may be between 35 ° and 75 °C and preferably between 50 ° and 72 °C. If polymerization is conducted at high temperatures, small amounts of ASP will suffice to accelerate the reaction, whilst at lower temperatures the amount of ASP used can exceed that of the IPP or TBP.

Hitherto the prevailing opinion has been that the suspension polymerization of vinyl chloride must be carried out in an alkaline medium, preferably in the presence of buffer salts, the alkaline buffer salts being provided to neutralize the hydrochloric acid eliminated from the PVC chain. It was thus particularly surprising to discover that the polymerization carried out with the initiator combinations of the invention gives best results at pH values below 8.0. It is preferred to operate at a pH between 4.0 and 7.0. At pH's above 8.0 the running times of the polymerization are substantially longer than in acid medium. The polymerization should be conducted substantially at pH values below 8.0, that is, the advantages gained by the invention are still achieved even if the pH rises above 8.0 for a short period during the polymerization reaction, for example, if polymerization is initiated at a pH slightly above 8.0 but the pH then falls very rapidly. The pH may be adjusted by the addition of acid, for example aqueous hydrochloric acid, at the commencement of polymerization. Surprisingly, the final pH value does not then differ from that obtained where no addition of hydrochloric acid is made (see Table 5, Example 5l). The desired pH may alternatively be obtained by adding acid or neutral buffer salts, for example ammonium acetate. It is possible in principle to conduct the polymerization reaction in pure water without added buffer compounds, but this method suffers from the disadvantage that the polymerization is then very sensitive to external influences.

At the conclusion of the polymerization the acid may be neutralized by adding small quantities of ammonia, and the thus formed ammonium salts may be removed with the water. This prevents traces of acid components from remaining in the polyvinyl chloride which would have a corrosive action on processing machines.

Conveniently, the polymerization reaction is stopped when 85 percent conversion or more, preferably 88 percent to 92 percent conversion, has been achieved. In conventional vinyl chloride polymerization processes running times of more than 10 hours are the rule. Using the process of the invention it is possible to achieve running times of less than 7 hours and in some cases of less than 5 hours. Moreover, the polymerization progresses so steadily that the heat of polymerization may be removed by the usual means.

The polymers obtained by the present process show no appreciable difference in quality from those produced by conventional suspension polymerization processes.

The invention is further described with reference to the following Examples, in which the parts and percentages are by weight. The K values were measured in 0.5 percent solutions in cyclohexanone at 25°C (H. Fikentscher, "Cellulosechemie," 13, 60 (1932).

EXAMPLE 1

Into a glass-lined 1,000 liter autoclave fitted with stirrer and temperature control means there are charged 378 kg of water containing 130 g of an oxypropylated cellulose ether as suspension stabilizer, and 44 g of ASP together with 100 g of TBP. The pH is then adjusted to about 4.0 by the addition of 80 ml of 1N hydrochloric acid solution. The autoclave is then closed and the air contained therein is displaced by nitrogen, whereupon 222 kg of vinyl chloride mixed with nitrogen are pumped into the autoclave. The nitrogen present in the autoclave is removed by degasification and polymerization is carried out at 55°C with rapid stirring. The vinyl chloride pressure reaches 8 atm. gauge. When the pressure has fallen 4.0 atm. below the maximum pressure, polymerization is stopped. The conversion at this stage is about 91 percent. The remaining monomer is removed, the suspension is neutralized with ammonia and the product is separated from the water by centrifuge and then dried. There is thus produced a suspension polyvinyl chloride having a K value of 71.

Comparative experiments were carried out in the same manner using the two initiator components alone or combined with LPO and AIBN. The results are given in Table 1.

EXAMPLE 2

The procedure described in Example 1 is repeated except that the initiators comprise a combination of 31 g of ASP and 22 g of IPP. The results, together with those of comparative experiments, are given in Table 2.

EXAMPLE 3

The procedure described in Example 1 is repeated except that the initiators comprise a combination of 23.5 g of ASP and 100 g of TBP and the polymerization reaction is conducted at 62°C. The pressure reaches 9.6 atm. gauge. The product is a suspension polymer having a K value of 65. The results and those of comparative experiments are given in Table 3.

EXAMPLE 4

The procedure described in Example 1 is repeated except that different pH values are used by using different buffer salts. The results are given in Table 4.

EXAMPLE 5

The procedure described in Example 2 is repeated except that different pH values are used by using different buffer salts. The results are given in Table 5.

The items in the Tables have the following significance:

initiator: percentage concentration of each initiator component in parts by weight calculated on the quantity of monomer;

running time: duration of polymerization in hours until stopped at 91 percent conversion;

final pressure: pressure in atm. gauge inside the polymerization vessel when polymerization is stopped;

$\Delta$ T max: the maximum difference in °C between the constant temperature maintained within the polymerization vessel and the temperature of the cooling jacket; this difference increases as the amount of heat removed by the coolant increases, and $\Delta$ T is thus a measure of maximum heat removal;

$t_1$: time, in hours, until said maximum temperature difference occurs; the appearance of two numbers indicates that maximum heat removal was achieved twice during polymerization;

$t_2$: number of hours of the polymerization time in which maximum heat removal occurred; this figure is a measure of the steadiness of the polymerization reaction.

TABLE 1

| Example | 1a | 1b | 1c | 1d | 1e |
|---|---|---|---|---|---|
| initiator: | | | | | |
| ASP | 0.02 | | 0.02 | 0.02 | 0.02 |
| TBP | 0.045 | 0.045 | | | |
| LPO | | | | | 0.10 |
| AIBN | | | | 0.045 | |
| running time | 6.5 | 12.5 | >24 | 12.0 | 10.5 |
| final pressure | 4.4 | 4.5 | 8.0 | 5.5 | 4.5 |
| $\Delta$ T max | 16 | 16 | 14 | 16 | 16 |
| $t_1$ | 0.5 | 6.5 | 0.5 | 0.5/7.5 | 0.5/8.5 |
| $t_2$ | 4.5 | 0 | 0 | 0 | 0 |
| remarks | acc. to invention | | no press. drop | | |

TABLE 2

| Example | 2a | 2b | 2c | 2d |
|---|---|---|---|---|
| initiator: | | | | |
| ASP | 0.014 | | 0.014 | 0.014 |
| IPP | 0.01 | 0.024 | | |

TABLE 3 (continued from previous page)

| | | | | |
|---|---|---|---|---|
| LPO | 6.0 | 10.5 | >24 | 0.10 |
| running time | 4.5 | 4.5 | 8.0 | 10.5 |
| final pressure | 16 | 16 | 16 | 4.6 |
| Δ T max | 0.5 | 5.5 | 0.5 | 16.5 |
| $t_1$ | 4.5 | 0 | 0 | 0.5/8.5 |
| $t_2$ | acc. to invention | | no press. drop | 0 |
| remarks | | | | |

TABLE 3

| Example | 3a | 3b | 3c | 3d | 3e |
|---|---|---|---|---|---|
| initiator: | | | | | |
| ASP | 0.01 | | 0.01 | 0.01 | 0.01 |
| TBP | 0.045 | 0.045 | | | |
| LPO | | | | | 0.09 |
| AIBN | | | | 0.45 | |
| running time | 4.5 | 6.5 | >24 | 8.5 | 7.5 |
| final pressure | 6.1 | 6.2 | 9.8 | 6.3 | 6.2 |
| Δ T max | 23 | 23 | 23 | 22.5 | 25 |
| $t_1$ | 0.5 | 5.0 | 0.5 | 0.5/5.5 | 6.0 |
| $t_2$ | 3.5 | 0 | 0 | 0 | 0 |
| remarks: | acc. to invention | | no press. drop | | |

TABLE 4

| Example | 4a (1a) | 4b | 4c | 4d |
|---|---|---|---|---|
| buffer | 80 ml 1N HCl | 130 g $(NH_4)CO_3CH_3$ | 130 g $NaHCO_3$ | 130 g $(NH_4)_2CO_3$ |
| pH at start | 4.2 | 6.7 | 7.8 | 8.5 |
| pH at finish | 3.0 | 4.7 | 7.2 | 7.4 |
| running time | 6.5 | 8.0 | 7.8 | 16.0 |
| final pressure | 4.5 | 4.4 | 4.5 | 4.5 |
| Δ T max | 16 | 16.1 | 16 | 16 |
| $t_1$ | 0.5 | 0.5 | 5.0 | 6.5 |
| $t_2$ | 4.5 | 4.5 | 0 | 0 |

TABLE 5

| Example | 5a | 5b | 5c | 5d |
|---|---|---|---|---|
| buffer | none | 80 ml 1N HCl | 130 g $NaHCO_3$ | 130 g $(NH_4)_2CO_3$ |
| pH at start | 8.3 | 4.2 | 7.8 | 8.6 |
| pH at finish | 3.0 | 3.0 | 7.3 | 7.5 |
| running time | 7.0 | 6.0 | 7.5 | 17.0 |
| final pressure | 4.5 | 4.5 | 4.5 | 4.5 |
| Δ T max | 16 | 16 | 16 | 16 |
| $t_1$ | 4.5 | 4.5 | 0 | 0 |

EXAMPLE 6

Into a 15 cu.m. autoclave fitted with stirrer there are charged 8,000 kg of water, 3 kg of an oxypropylated cellulose ether as suspension stabilizer and 0.2 g of ASP plus 0.3 g of IPP. The pH is adjusted to 4.0. After displacement of the air by nitrogen 5000 kg of vinyl chloride is pumped into the autoclave.

Polymerization is started by raising the temperature to 50°C. The pressure reaches approximately 7 atm. gauge. After a period of 8 hours the pressure has dropped to 4.0 atm. gauge at 89 percent conversion.

The product is worked up to give a suspension polyvinyl chloride having a K value of 76.

What we claim is:

1. In a process for the manufacture of polymers and copolymers of vinyl chloride by the polymerization of vinyl chloride alone or together with up to 30 percent by weight of comonomers, in aqueous suspension and in the presence of peroxidic initiators and a water-soluble protective colloid, the improvement which comprises using as said initiators a mixture of 0.001 to 0.06 part by weight of acetyl cyclohexane sulfonyl peroxide with 0.002 to 0.1 part by weight of t-butyl perpivalate or di-isopropyl percarbonate, per 100 parts of monomer, the polymerization being conducted substantially at a pH between 4.0 and 7.0 at temperatures between 50° and 72°C.

2. A process as claimed in claim 1 wherein said mixture of initiators, by weight, consists essentially of 0.001 to 0.06 part of acetyl cyclohexane sulfonyl peroxide with 0.005 to 0.1 part of t-butyl perpivalate, per 100 parts of monomer, polymerization being carried out at a pH between 4.0 and 7.0 at temperatures between 50° and 72°C.

3. A process as claimed in claim 1 wherein said mixture of initiators, by weight, consists essentially of 0.001 to 0.06 part of acetyl cyclohexane sulfonyl peroxide with 0.002 to 0.1 part of di-isopropyl percarbonate, per 100 parts of monomer, polymerization being conducted at a pH between 4.0 and 7.0 at temperatures between 50° and 66°C.

4. Process as claimed in claim 1 wherein polymerization is carried out in the presence of 0.01 to 1.0 percent by weight of protective colloids calculated on the weight of monomer used.

5. A process as claimed in claim 1 wherein the ratio of water to monomer during the suspension polymerization is between 1:1 and 4:1.

6. A process as claimed in claim 1 wherein polymerization is stopped after a conversion of more than 85 percent has been reached.

7. A process as claimed in claim 1 wherein polymerization is stopped after a conversion of between 88 and 92 percent has been reached.

* * * * *